United States Patent
Tamian

(10) Patent No.: US 7,097,597 B2
(45) Date of Patent: Aug. 29, 2006

(54) ADJUSTABLE BICYCLE PEDAL TRAINING DEVICE

(75) Inventor: Richard Tamian, 69 Edison Ter., Sparta, NJ (US) 07871

(73) Assignee: Richard Tamian, Sparta, NJ (US)

(*) Notice: Subject to any disclaimer, the term of this patent is extended or adjusted under 35 U.S.C. 154(b) by 319 days.

(21) Appl. No.: 10/872,829

(22) Filed: Jun. 21, 2004

(65) Prior Publication Data

US 2005/0280225 A1  Dec. 22, 2005

(51) Int. Cl.
*A63B 22/06* (2006.01)
*G05G 1/14* (2006.01)

(52) U.S. Cl. ........................ 482/57; 74/594.7
(58) Field of Classification Search ............ 482/57–65; 74/594.1, 2, 4, 594.6, 7; 280/29, 256
See application file for complete search history.

(56) References Cited

U.S. PATENT DOCUMENTS

| | | | | |
|---|---|---|---|---|
| 599,909 A | * | 3/1898 | Latta | .......................... 74/594.7 |
| 4,338,829 A | * | 7/1982 | Ozaki | .......................... 74/594.4 |
| 4,599,915 A | * | 7/1986 | Hlavac et al. | ............. 74/594.4 |
| 4,973,046 A | * | 11/1990 | Maxwell | ....................... 482/60 |
| 6,629,472 B1 | | 10/2003 | Scheidling et al. | |
| 2003/0094072 A1 | * | 5/2003 | Chen | .......................... 74/594.4 |
| 2003/0188602 A1 | * | 10/2003 | Lubanski | .................... 74/594.4 |

* cited by examiner

*Primary Examiner*—Jerome Donnelly
*Assistant Examiner*—Tam Nguyen

(57) ABSTRACT

The adjustable bicycle pedal training device of the invention is a simple, easy to install device used by beginner cyclists for learning how to balance and ride a two wheel bicycle without the physical support from a non-rider and without the aid of other bicycle training devices, wherein said device replaces the customary right and left pedals on a bicycle. Each pedal member can be adjusted into two stages, wherein stage 1, stage 1 is the shortened and contracted stage, such that, said device pedals do not interfere with the motion of the rider's legs when maneuvering the bicycle forward, while the octagonally shaped design of said invention in this stage provides the beginner with eight foot pedal surfaces that facilitate and improve the pedaling and learning process. After the cyclist has developed, learned, and mastered said balancing skills, the pedal training device is then adjusted to the longer and expanded stage and utilized as standard bicycle pedals to propel said bicycle forward.

3 Claims, 3 Drawing Sheets

ADJUSTABLE BICYCLE PEDAL TRAINING DEVICE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF INVENTION

This invention relates generally to a device for training beginner bicyclists on how to develop the proper balance and coordination skills necessary for riding a two wheel bicycle. The present invention provides an easy, unaided, and effective way for mastering said bicycling skills.

Learning how to ride a two wheel bicycle is a very difficult task for young children and beginner cyclists, especially since they lack the necessary coordination and balancing skills associated with said task. The customary approach for achieving said bicycling skills is to utilize a set of training wheels, which is attached to the bicycle's rear wheel assembly, as portrayed in prior U.S. Pat. Nos. 6,588,788; 6,419,256; 6,318,745; D345,948, and others. However, using said method is antiquated and ineffective. One major drawback is that the learner tends to lean on the training wheels for support much like riding a tricycle, creating a dependency for said training wheels, whereby preventing the learner from developing the necessary balancing skills. It could take weeks before the learner is weaned off these training wheel devices, whereby the learner develops said balancing skills more by chance than from their design. Another disadvantage is that since there are many different bicycle models and sizes for the beginner, the manufacturing and stocking of each specific type of training wheel device for said models and sizes can get rather costly.

Alternative methods for learning how to ride a bicycle employ straps (U.S. Pat. No. 5,226,820 and others); seats (U.S. Pat. No. 6,631,948 and others); poles (U.S. Pat. No. 5,915,711 and others), and handles (U.S. Pat. Nos. 6,349,958; 5,791,675; 4,917,398 and others). The significant disadvantage of said devices is that a trainer must always be present and running along side the bicycle, while holding onto said device. Hereto, the development of said bicycling skills by the learner is again delayed due to the dependency on the yaw support provided by the trainer and the device. Gyroscopic support devices, such as U.S. Pat. No. 6,676,150 and others, also create a similar dependent condition for the learner. These gyroscopic devices can get very costly to manufacture, to stock and to purchase.

Presently, all bicycle pedals as in (U.S. Pat. Nos. 6,647,826; 6,513,408; 6,490,948; 6,446,529; 6,230,583; Des 257,249; Des 248,635 and others) are made too long in length, when used as a training pedal device by the beginner cyclist. Said pedals jut out too far longitudinally from the bicycle pedal crank arms, from where they are attached, and tend to collide with the rider's legs, resulting in the loss of stability and maneuverability of said bicycle, thus hindering the balancing and learning process to occur. To correct this problem, the longitudinal length of said pedal should be made variable and shorter, whereby resulting in no physical contact between the rider's leg and said pedal device. The adjustable pedal device (U.S. Pat. No. 6,629,472) can adjust longitudinally to some degree, in arc fashion, however, its design and functionality does not pertain to that of my invention.

BRIEF SUMMARY OF THE INVENTION

The adjustable bicycle pedal training device of the invention is a simple, easy to install device that effectively self-teaches the beginner cyclist how to balance and ride a two wheel bicycle. Said training pedals replace the customary right and left bicycle pedals and connect to the conventional sprocket crank arms on the bicycle.

An object of the present invention is to provide a self-teaching method that will enable the beginner cyclist to develop the necessary balancing skills for riding a two wheel bicycle, while not having to rely upon the physical support from a non-rider and other bicycle training devices. Each pedal member can be adjusted into two stages, wherein stage 1, as shown in FIG. 2, is the shortened and contracted setting, such that said device pedals do not interfere with the motion of the rider's legs when maneuvering the bicycle forward, as standard pedals would. The octagonally shaped design of said invention in this stage also provides the beginner with eight foot pedal surfaces that facilitate and improve the pedaling process. After the cyclist has developed, learned, and mastered said balancing skills, the pedal training device is then adjusted to the longer and expanded stage 2, as shown in FIG. 1, and utilized as standard bicycle pedals to propel said bicycle forward.

Since the adjustable bicycle pedal device fits all bicycle sizes and models, the expense of manufacturing, stocking and of purchasing the adjustable bicycle training pedals should not be any more costly than a standard bicycle pedal set. Other advantages and essential details of the invention will become apparent from the subsequent description of preferred embodiments, the drawings, and the claims.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

The adjustable bicycle pedal training device of the invention is a simple, easy to install device that effectively self-teaches the beginner cyclist how to balance and ride a two wheel bicycle, whereby said training pedals replace the customary right and left bicycle pedals and connect to the conventional sprocket crank arms on the bicycle. Each pedal member can be adjusted into two stages, wherein stage 1, as illustrated in FIG. 2, is first utilized by the beginner cyclist for learning how to balance and develop the skills necessary for riding a two wheel bicycle, while stage 2, as illustrated in FIG. 1, is used primarily as a standard bicycle pedal after the student has acquired said necessary bicycle riding and balancing skills.

Figure 1:
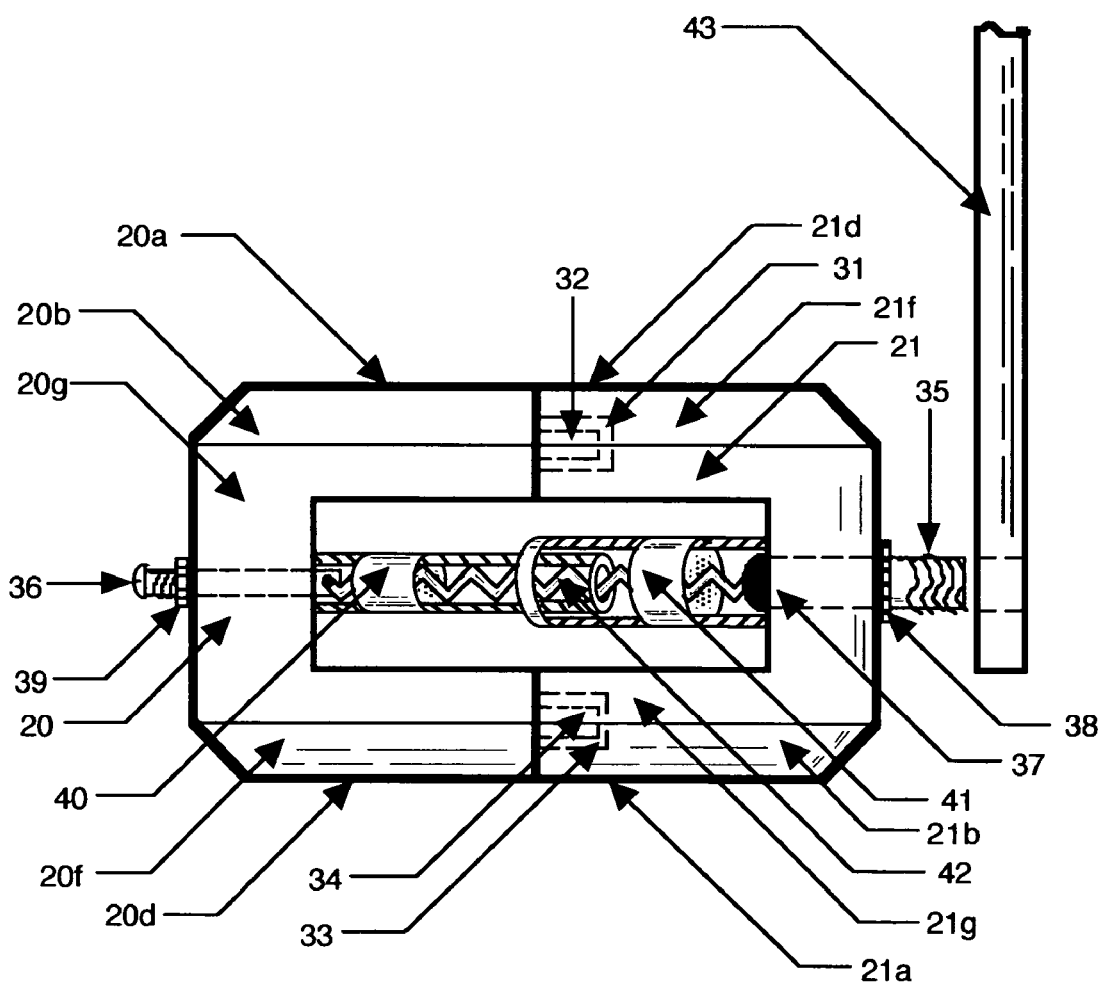
FIG. 1 is a simplified view of an adjustable bicycle pedal training device according to the invention, shown in the expanded stage, wherein the two pedal pieces 20 and 21 are interlocked by the tongues 32 and 34 into the grooves 31 and 33 respectively, and held together by the tensional force of the spring 42, whereby said spring is located inside both the inner support tube 40 and the outer support tube 41 and is attached to an adjustable lug bolt 36 on said pedal piece 20 at one end and said pedal piece 21 at the other. Also attached to pedal piece 20 is one end of said inner support tube 40, while the non-secured end of said inner support tube 40 is allowed to move freely inside the non-secured end of said outer support tube 41, which is secured to pedal piece 21 at its other end. Each pedal member is connected and threaded onto a bicycle pedal crank arm 43 by the axle bolt 35, such that said pedal device rotates freely about said axle bolt 35 by a bearing, sleeved collar 38.

Referring particularly to FIG. 1, the adjustable bicycle pedal training device, according to the illustrated embodiment, is shown in said expanded stage 2 and comprises two pedal pieces 20 and 21, which are held together by tongue and groove connections, wherein, said tongues 32 and 34 interlock into said grooves 31 and 33 respectively, and being held in place by the tensional force of spring 42. Said spring 42 is stretched along the center of the longitudinal axis of said pedal device and is connected from bolt 37 on said pedal piece 21 to an adjustable set screw 36 on said pedal piece 20. The stiffness of said spring 42 is fashioned such that the spring's tensile force is sufficient to hold pedal pieces 20 and 21 together in said stage 2 position. Set screw 36 consists of a threaded shaft that when turned clockwise and counterclockwise will lengthen and shorten said spring respectively, thus further adjusting the proper tensile strength of said spring 42, and a set nut #39, which secures said shaft's adjusted length. Surrounding the connective spring 42, are two support tubes 40 and 41, wherein, an inner support tube 40 has sufficient diameter to enclose said spring 42, and is attached to pedal piece 20 at one end, while its other end is free to move within the open end of an outer support tube 41, whose diameter is selected to enclose said inner support tube 40. The other end of said outer support tube 41 is firmly attached to said pedal piece 21. The necessary longitudinal strength for said pedal device is achieved by the overlapping of said tubes 40 and 41, wherein, the composition of said tubes 40 and 41 can be made from any rigid, light weight material, such as aluminum, plastic, etc., that will not bend nor crack, when foot pressure is applied for pedaling. The pedal body can be made from any durable plastic compound.

Figure 2:
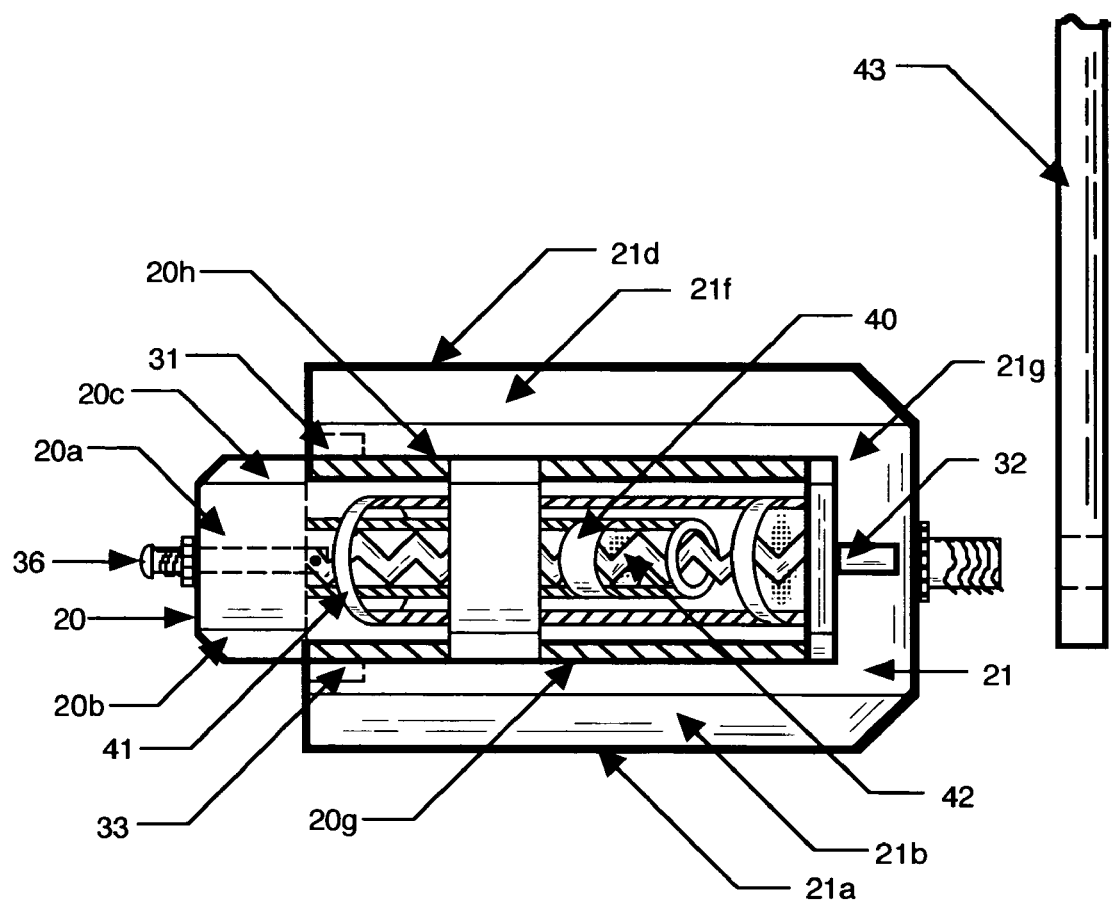
FIG. 2 is a simplified view of an adjustable bicycle pedal training device according to the invention, shown in the shorten or contracted stage 1 position, wherein pedal piece 20 has been pulled apart from pedal piece 21, by the operator, thus disengaging both tongue and grove connections. Then, by twisting said pedal piece 20 by 90 degrees and releasing it, said pedal piece 20 retracts into pedal piece 21 and is held in place by the tensional force of said spring 42, into said contracted and shortened stage.

Referring particularly to FIG. 2, the adjustable bicycle pedal training device, according to the illustrated embodiment, is shown in the contracted stage, and is derived from the expanded stage as first illustrated in FIG. 1, in the following manner: (a) First, said pedal piece 20 is manually pulled apart from pedal piece 21 by the operator, thus disengaging both tongue and groove connections; (b) By twisting said pedal piece 20 by 90° degrees, then releasing it, said pedal piece 20 will retract into pedal piece 21 and will be held in place by the tensional force of said spring 42. The longitudinal length of said pedal device has been reduced and shortened, while the interlocking pedal pieces 20 and 21 now form an eight sided polygon.

Figure 3:
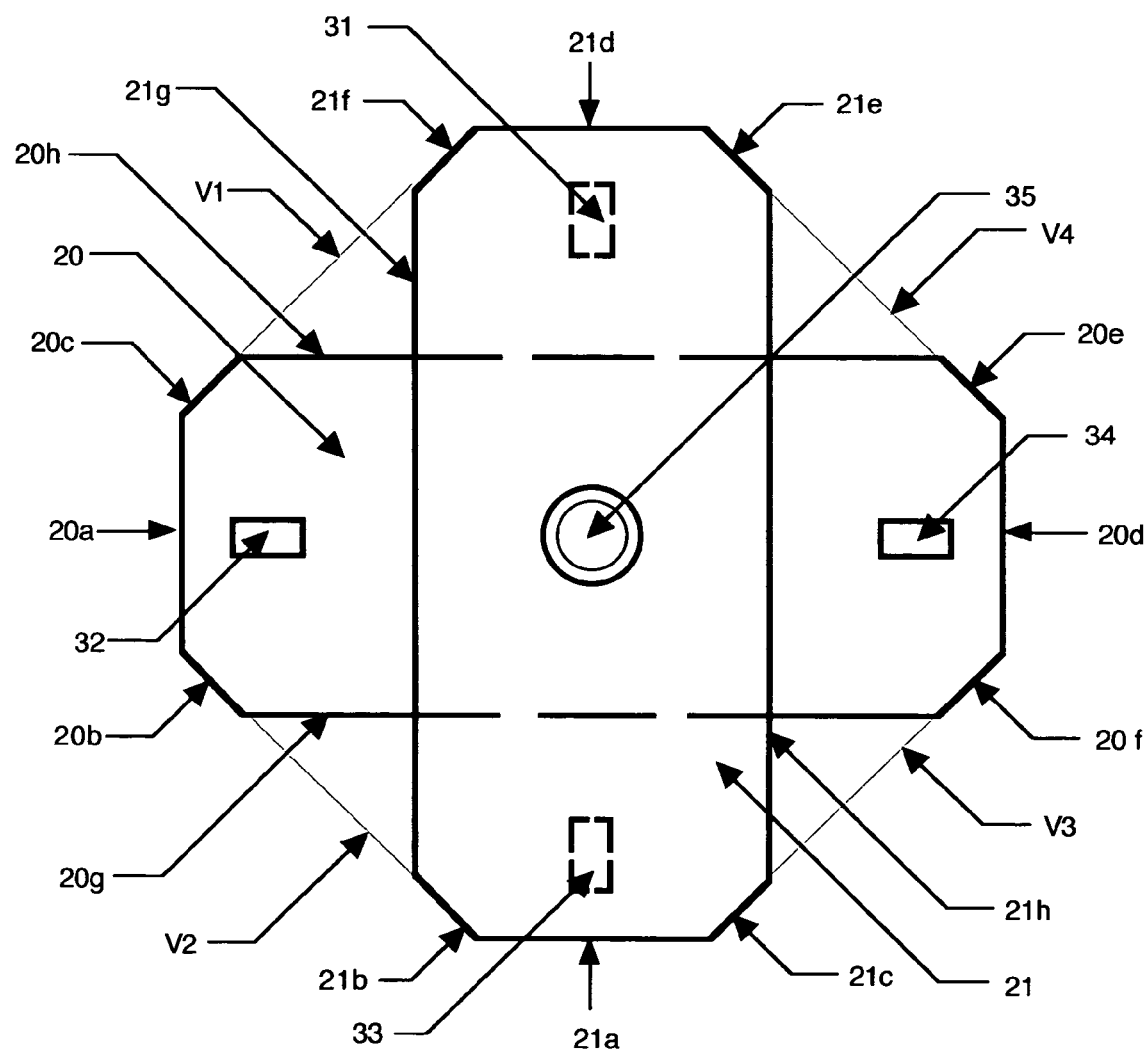
FIG. 3 is a simplified front view, showing said shortened, contracted stage of said adjustable bicycle pedal training device, as illustrated in FIG. 2, showing the actual and virtual foot pedal surfaces used by the operator to propel the bicycle forward. The actual pedal surfaces are labeled 20*a*, 20*d*, 21*a*, and 21*d*. The virtual pedal surfaces are labeled V1, V2, V3, and V4, whereby said virtual surfaces are formed when the cyclist's foot rests on the beveled surfaces of pedal pieces 20 and 21, such that beveled surfaces 21*f* and 20*c* form said virtual surface V1; likewise, beveled surfaces 20*b* and 21*b* form said virtual surface V2; likewise, beveled surfaces 21*c* and 20*f* form said virtual surface V3; and finally, beveled surfaces 20*e* and 21*e* form said virtual surface V4. In said contracted stage, said actual and virtual pedal surfaces combine to form an octagon, which provides the beginner with eight pedal surfaces that facilitate and improve the pedaling process.

FIG. 3 illustrates the pedal device in the contracted stage 1 position in a front view. The octagonal design of said device offers eight pedal faces, comprised of both actual and virtual foot pedal surfaces. The actual pedal surfaces are labeled 20*a*, 20*d*, 21*a*, and 21*d*. The virtual pedal surfaces are labeled V1, V2, V3, and V4, whereby said virtual surfaces are formed when the cyclist's foot rests on the beveled surfaces of pedal pieces 20 and 21 concurrently, such that beveled surfaces 21*f* and 20*c* form said virtual surface V1; likewise, beveled surfaces 20*b* and 21*b* form said virtual surface V2; likewise, beveled surfaces 21*c* and 20*f* form said virtual surface V3; and finally, beveled surfaces 20*e* and 21*e* form said virtual surface V4. In said contracted stage, said actual and virtual pedal surfaces combine to form an octagon, which provides the beginner with eight pedal surfaces that facilitate and improve the pedaling process.

My process for learning how to ride a two wheel bicycle is accomplished in the following manner: (a) First, an appropriate size bicycle is selected. Then the bicycle seat is adjusted such that the cyclist's feet can be placed squarely on the ground. (b) With said training device pedals installed and adjusted to the shorter, phase 1 setting, as illustrated in FIG. 2, the beginner, while seated, first walks the bicycle forward with small steps, then progresses to longer strides, and finally culminates with coasting. One advantage of my device pedals over the two-sided standard pedals, is that they will not collide and interfere with the motion of the rider's legs, as the bicycle is being maneuvered forward. Therefore, the beginner cyclist can now unencumberly compensate for any yaw instability of the bicycle, without the fear and pain of pedal collision with the legs. (c) Next, by lifting the feet up off the ground for a longer period of time each time while coasting, the cyclist learns how to coordinate the steering and balancing skills together. (d) Finally, when these said skills are incorporated with the use of said device pedals for propulsion, the cyclist will have learned how to ride the bicycle successfully. Another drawback when using a standard two-sided pedal is that the cyclist's foot may come to rest on the narrow portion of said pedal. So as foot pressure is applied for propulsion, the pedal can flip suddenly to the wider section, which causes a loss of coordination and balance, wherein, affecting the stability and control of the bicycle, thus inhibiting the learning process. My adjustable bicycle pedal, with its octagonal shaped design, in said stage 1 setting, solves this problem by the cyclist the advantage of having eight pedal surfaces instead of just the standard two, whereby, facilitating foot placement and eliminating any unexpected pedal rotation. (e) After the cyclist has exhibited a proficiency for riding the bicycle, the device pedals are adjusted to the stage 2 setting, as illustrated in FIG. 1, and utilized as regular bicycle pedals for propulsion.

What I claim as my invention is:

1. An adjustable bicycle pedal training device for use by a beginner cyclist to learn how to ride a bicycle, wherein said device would replace the customary right and left pedals on a bicycle, the device comprises:

- a longitudinal axis;
- two pedals, each having a right "U"-shaped pedal component and a left "U"-shaped pedal component that are held together by a tension spring stretched along the longitudinal axis and two tongue and groove connections in a first expanded stage;
- an axle bolt, connected to either the left or the right pedal component, for coupling the device to a bicycle crank; and
- an inner support tube disposed on the left pedal component and around a portion of the spring and an outer support tube disposed on the right pedal component and around a portion of the spring and the inner support tube; wherein the tension spring has a first end connected to a bolt disposed on the right pedal component and a second end connected to an adjustable set screw disposed on the left pedal component to bias the right and left pedal components together while still allowing the pedal components to be uncoupled from each other at the tongue and groove connections and twisted 90 degrees relative to each other to be reconfigured into a shortened stage.

2. The device as claimed in claim 1, wherein the adjustable set screw may be rotated in one direction to lengthen the tension spring and the opposite direction to shorten the tension spring thereby adjusting the spring's tension force and thus the force required to adjust the pedal device between the expanded stage and the shortened stage.

3. The device as claimed in claim 1, wherein the pedal components each include four beveled edges such that when the device is twisted into the shortened stage, four pedal surfaces and four virtual pedal surfaces are formed to provide a cyclist with additional surfaces to facilitate pedaling.

* * * * *